(12) United States Patent  
Sato

(10) Patent No.: US 9,224,079 B2  
(45) Date of Patent: Dec. 29, 2015

(54) IMAGE PROCESSING APPARATUS CONFIGURED TO PERFORM PIXEL DITHERING BASED ON DITHERING TABLE AND PASS INFORMATION

(71) Applicant: Nobuyuki Sato, Kanagawa (JP)

(72) Inventor: Nobuyuki Sato, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/487,407

(22) Filed: Sep. 16, 2014

(65) Prior Publication Data

US 2015/0077809 A1 Mar. 19, 2015

(30) Foreign Application Priority Data

Sep. 17, 2013 (JP) .................................. 2013-192402

(51) Int. Cl.
G06K 15/00 (2006.01)
G06K 15/02 (2006.01)
G06K 15/14 (2006.01)

(52) U.S. Cl.
CPC ............ *G06K 15/1876* (2013.01); *G06K 15/14* (2013.01)

(58) Field of Classification Search
None
See application file for complete search history.

(56) References Cited

U.S. PATENT DOCUMENTS

| 7,564,591 | B1 * | 7/2009 | Takahashi et al. ............ 358/3.21 |
| 8,184,339 | B2 * | 5/2012 | Marumoto et al. .. G06K 15/105 347/15 |
| 2008/0180475 | A1 * | 7/2008 | Eldar et al. ....................... 347/13 |
| 2009/0010498 | A1 * | 1/2009 | Gaston et al. .................. 382/112 |
| 2009/0086231 | A1 * | 4/2009 | Marumoto ...................... 358/1.9 |
| 2009/0161165 | A1 * | 6/2009 | Fujimoto et al. ............... 358/2.1 |
| 2009/0244572 | A1 * | 10/2009 | Hansaki et al. ................. 358/1.9 |
| 2012/0062636 | A1 * | 3/2012 | Yamamoto et al. .............. 347/15 |
| 2012/0063802 | A1 | 3/2012 | Suzuki et al. |

FOREIGN PATENT DOCUMENTS

JP 2001-088371 4/2001
JP 4345295 7/2009

* cited by examiner

*Primary Examiner* — Dung Tran
(74) *Attorney, Agent, or Firm* — Oblon, McClelland, Maier & Neustadt, L.L.P.

(57) ABSTRACT

An image processing apparatus includes a dithering unit that retains a dithering table; a gray-scale value input unit that inputs, to the dithering unit, a gray-scale value of each pixel constituting image data of a predetermined color; and a pass information input unit that inputs, to the dithering unit, pass information indicating whether printing is a first pass to perform printing on a recording medium yet to be printed or a second pass to perform reprinting on the same surface of the recording medium already subjected to printing. The dithering unit performs dithering on each pixel based on the dithering table, the gray-scale value, and the pass information.

12 Claims, 15 Drawing Sheets

FIG.6

|  | INPUT GRAY-SCALE VALUE ||
|  | SMALLER THAN THRESHOLD | EQUAL TO OR LARGER THAN THRESHOLD |
| --- | --- | --- |
| FIRST PASS | USE INPUT GRAY-SCALE VALUE WITHOUT ANY CHANGE | SET INPUT GRAY-SCALE VALUE TO THRESHOLD |
| SECOND PASS | SET INPUT GRAY-SCALE VALUE TO 0 | USE INPUT GRAY-SCALE VALUE WITHOUT ANY CHANGE, BUT MASK PORTION SUBJECTED TO PRINTING IN FIRST PASS |

FIG.7

| 239 | 159 | 207 | 255 |
| --- | --- | --- | --- |
| 47 | 111 | 63 | 175 |
| 127 | 79 | 143 | 191 |
| 15 | 95 | 31 | 223 |

$D_{i,j}$

FIG.8
FINAL PRINT RESULT     FIRST PASS     SECOND PASS
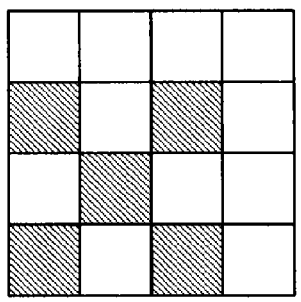 = 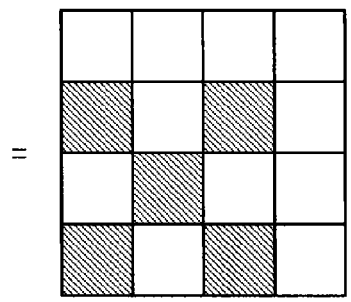 + 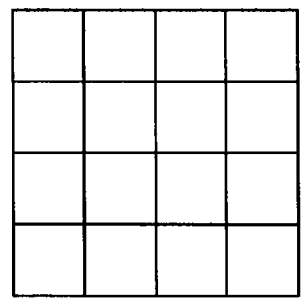
FIG.9
FINAL PRINT RESULT     FIRST PASS     SECOND PASS
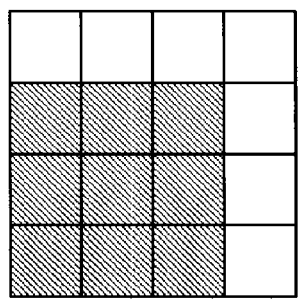 = 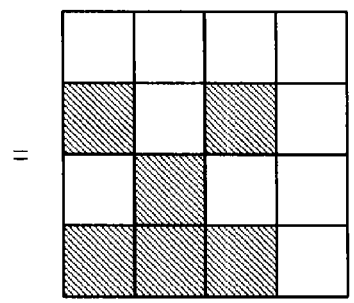 + 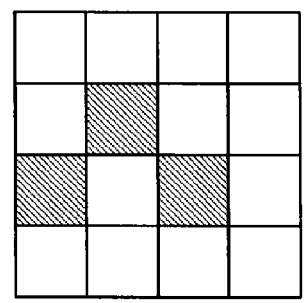

IMAGE PROCESSING APPARATUS CONFIGURED TO PERFORM PIXEL DITHERING BASED ON DITHERING TABLE AND PASS INFORMATION

CROSS-REFERENCE TO RELATED APPLICATIONS

The present application claims priority to and incorporates by reference the entire contents of Japanese Patent Application No. 2013-192402 filed in Japan on Sep. 17, 2013.

BACKGROUND OF THE INVENTION

1. Field of the Invention

The present invention relates to an image processing apparatus, an image processing method, and a computer program product.

2. Description of the Related Art

Conventionally widely known are electrophotography image forming apparatuses that transfer and fix a developer, such as a toner, onto a recording medium, such as a recording sheet, thereby performing printing. Such image forming apparatuses can transfer a maximum of 100% of respective color toners onto a recording medium. In the case of using toners of four colors, which are black (K), cyan (C), magenta (M), and yellow (Y), for example, a maximum of 400% of toners are transferred in total onto a recording medium.

However, there is a limit to the total amount of toner that can be fixed to a recording medium. A high-speed cut-sheet color printer used for printing businesses in the production printing field has a limit of approximately 250%, for example.

To address this, Japanese Patent No. 4345295 and Japanese Patent Application Laid-open No. 2001-088371, for example, disclose a technology of total amount control for reducing the amount of toner while preventing a change in colors to be printed as much as possible.

The conventional technologies reduce the total amount of developer by expressing gray, which is usually expressed with developers of CMY, with a developer of K. This results in reduction in the image quality, such as poor reproducibility in a shadow portion and a murky human skin color.

Recently, there have also been developed image processing apparatuses that perform printing with a transparent and colorless developer to make a printed material glossy. Such image processing apparatuses need to transfer a maximum of 100% of the transparent developer to be transferred onto the uppermost portion. To fix all the developers to a recording medium, only a maximum of approximately 150% of the developers of the other colors can be transferred, resulting in a reduced color reproduction range.

Some methods can be employed to perform printing while ensuring a color reproduction range and preventing reduction in the image quality, including a method for performing printing in twice. This method can also perform fixing in twice, making it possible to fix a maximum of approximately 250% of the developers (a maximum of approximately 500% thereof in total) in each fixing.

In a case where the number of colors of the developers used for printing is an odd number, such as 5, printing of a developer of a single color possibly needs to be performed in twice. In this case, dithering of the single color needs to be performed in twice.

Therefore, there is a need for an image processing apparatus, an image processing method, and a computer program product that are capable of performing dithering of a single color in twice.

SUMMARY OF THE INVENTION

An image processing apparatus includes a dithering unit that retains a dithering table; a gray-scale value input unit that inputs, to the dithering unit, a gray-scale value of each pixel constituting image data of a predetermined color; and a pass information input unit that inputs, to the dithering unit, pass information indicating whether printing is a first pass to perform printing on a recording medium yet to be printed or a second pass to perform reprinting on the same surface of the recording medium already subjected to printing. The dithering unit performs dithering on each pixel based on the dithering table, the gray-scale value, and the pass information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram for explaining dithering performed by a dithering unit according to the first embodiment;

FIG. 7 is a view of an example of a dithering table retained in the dithering unit according to the first embodiment;

FIG. 8 is a view of an example of a result of dithering performed by the dithering unit according to the first embodiment;

FIG. 9 is a view of another example of a result of dithering performed by the dithering unit according to the first embodiment;

DETAILED DESCRIPTION OF THE PREFERRED EMBODIMENTS

Exemplary embodiments of an image processing apparatus, an image processing system, an image processing method, and a computer program according to the present invention are described below in greater detail with reference to the accompanying drawings. The embodiments below each describe a case where the image processing system according to the present invention is applied to an electrophotography color printing system, specifically to a printing system in the production printing field that forms an image by superimposing color component images of five colors, which are black (K), cyan (C), magenta (M), yellow (Y), and clear (S), on a recording sheet. The embodiments are not limited thereto.

First Embodiment

Figure 1:
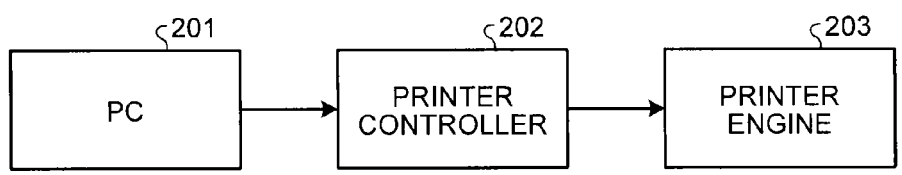
FIG. 1 is a block diagram of an exemplary configuration of an image processing system according to a first embodiment.

FIG. 1 is a block diagram of an exemplary configuration of an image processing system according to a first embodiment of the present invention. As illustrated in FIG. 1, the image processing system according to the first embodiment includes a personal computer (PC) 201, a printer controller 202 (an example of an image processing apparatus), and a printer engine 203.

The PC 201 creates print data and transfers the print data to the printer controller 202.

The printer controller 202 performs image processing, such as data decompression, color conversion, and dithering, on the transferred print data, thereby creating video data. The printer controller 202 transfers the video data to the printer engine 203.

Based on the transferred video data, the printer engine 203 forms (prints) a color image on a recording sheet (an example of a recording medium) and outputs the recording sheet.

Figure 2:
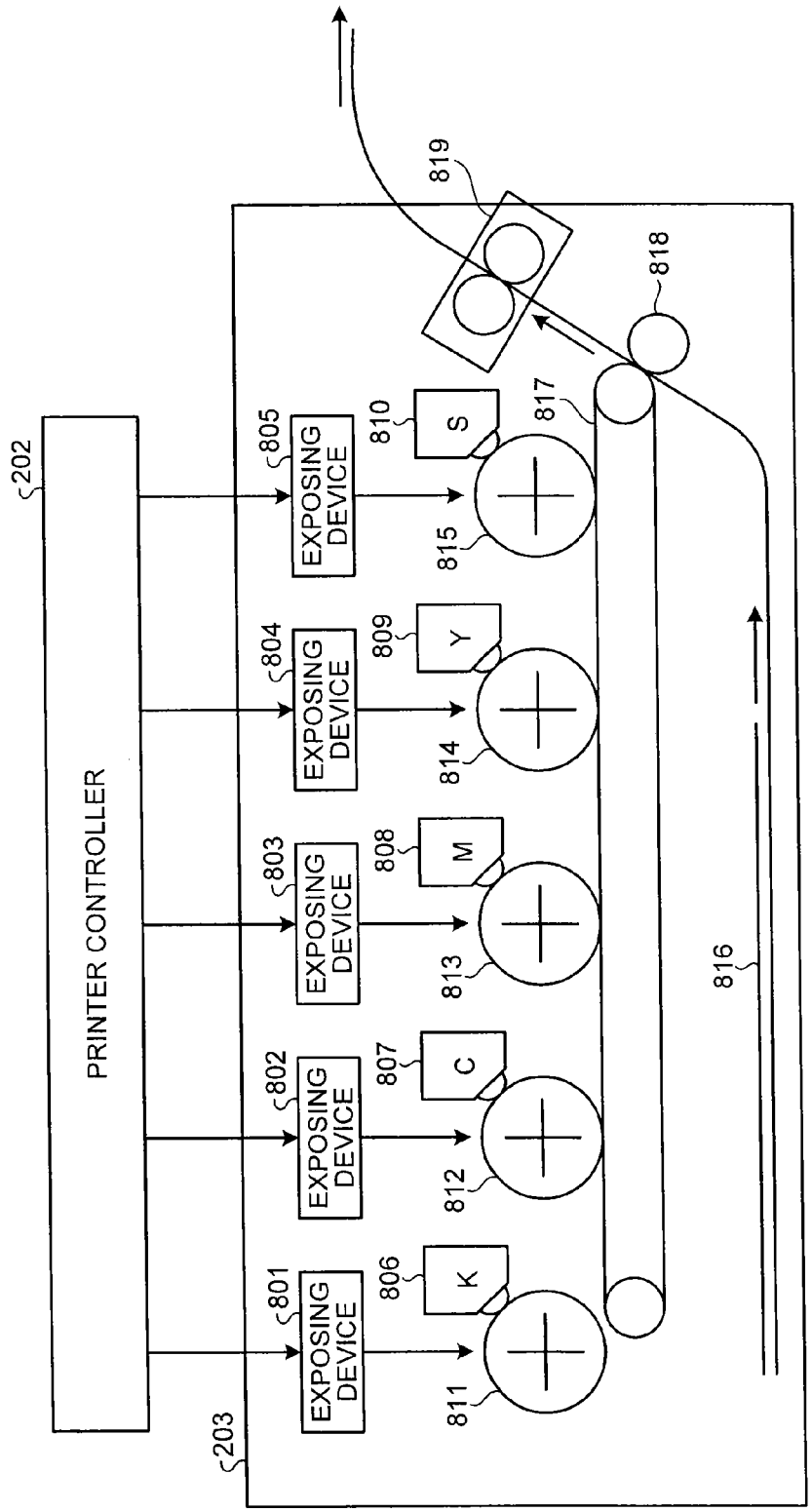
FIG. 2 is a schematic of an exemplary configuration of a printer engine according to the first embodiment.

FIG. 2 is a schematic of an exemplary configuration of the printer engine 203 according to the first embodiment. As illustrated in FIG. 2, the printer engine 203 includes a plurality of exposing devices 801 to 805, a plurality of developing units 806 to 810, a plurality of photoconductors 811 to 815, an intermediate transfer body 817, a transfer roller 818, and a fixing unit 819.

The exposing device 801, the developing unit 806, and the photoconductor 811 are used to form an image with a toner of K. The exposing device 802, the developing unit 807, and the photoconductor 812 are used to form an image with a toner of C. The exposing device 803, the developing unit 808, and the photoconductor 813 are used to form an image with a toner of M. The exposing device 804, the developing unit 809, and the photoconductor 814 are used to form an image with a toner of Y. The exposing device 805, the developing unit 810, and the photoconductor 815 are used to form an image with a toner of S.

The exposing devices 801 to 805 receive video data of the respective colors from the printer controller 202 and form electrostatic images of the respective colors on the surfaces of the photoconductors 811 to 815, respectively. The developing units 806 to 810 develop the electrostatic images on the photoconductors 811 to 815, respectively, with the respective color toners. Thus, monochromatic images of K, C, M, Y, and S are developed on the surfaces of photoconductors 811 to 815, respectively.

The monochromatic images of the respective colors are superimposed on the intermediate transfer body 817, thereby forming a full-color image including the clear toner. The transfer roller 818 transfers the conveyed full-color image onto a recording sheet 816 conveyed from a paper feed tray, which is not illustrated.

The fixing unit 819 applies heat and pressure to the recording sheet onto which the full-color image is transferred, thereby fixing the toner to the recording sheet. The fixing unit 819 then discharges the recording sheet to the outside of the printer engine 203.

The printer engine 203 can perform printing in twice to ensure a color reproduction range and prevent reduction in the image quality. Specifically, the printer engine 203 performs printing on a yet-to-be-printed recording sheet in printing of the first pass and performs reprinting on the same surface of the printed recording sheet in printing of the second pass. To perform printing of the second pass, a user needs to return the printed recording sheet discharged to the outside of the printer engine 203 to the paper feed tray.

Because the fixing is performed in twice, the printer engine 203 can fix a maximum of approximately 250% of toners in each fixing in a case where the total amount of toner fixable to the recording sheet by the printer engine 203 is a maximum of 250%. Thus, the printer engine 203 can fix a maximum of approximately 500% of toners in total to the recording sheet. This enables the printer engine 203 to perform printing with 100% of the toners of K, C, M, Y, and S, making it possible to ensure the color reproduction range and prevent reduction in the image quality.

Figure 3:
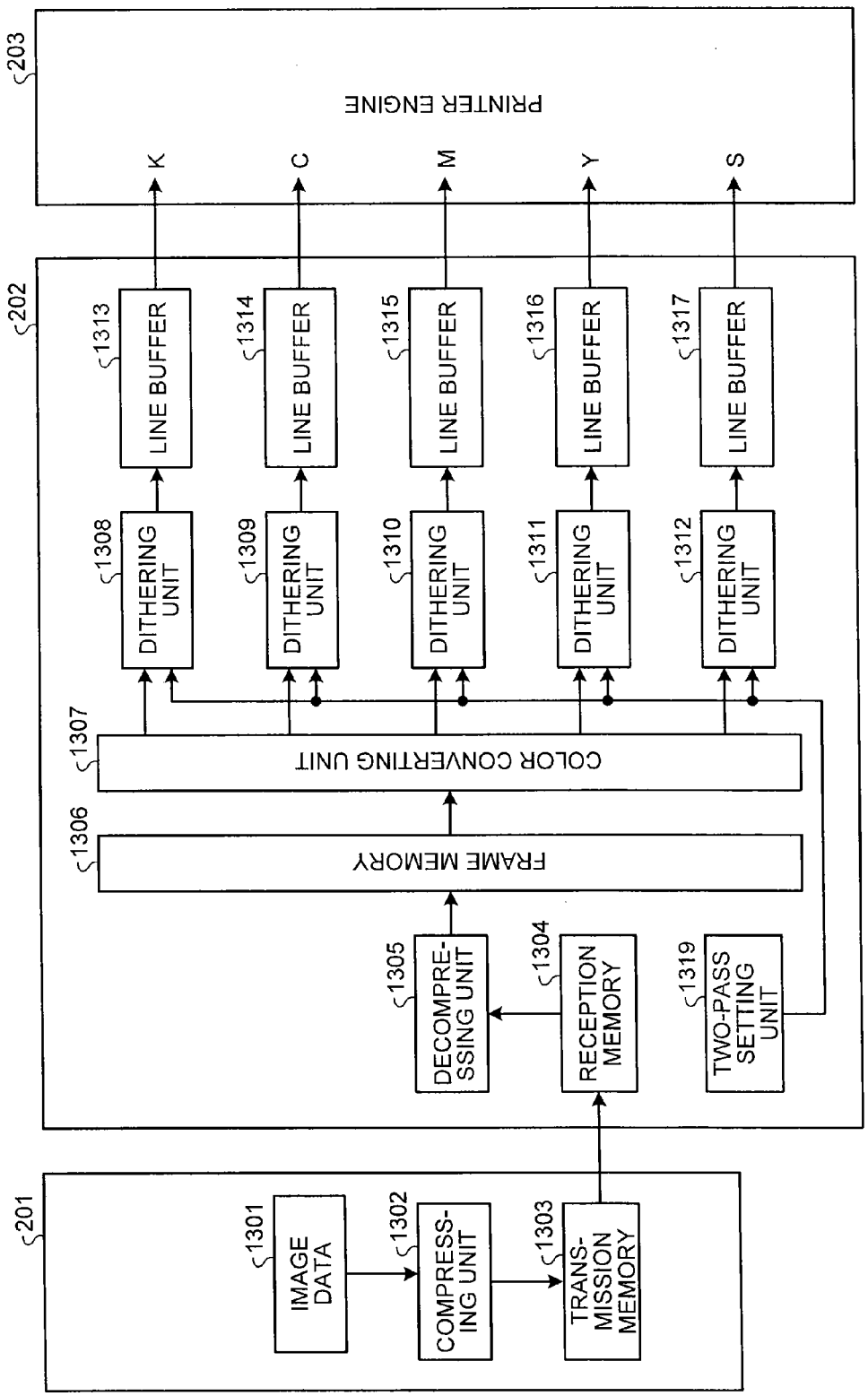
FIG. 3 is a schematic of an exemplary configuration of a PC and a printer controller according to the first embodiment.

FIG. 3 is a schematic of an exemplary configuration of the PC 201 and the printer controller 202 according to the first embodiment.

The PC 201 will be described. As illustrated in FIG. 3, the PC 201 includes a compressing unit 1302 and a transmission memory 1303.

The compressing unit 1302, for example, compresses bitmap image data 1301 of the respective colors including transparent image data and stores the created print data in the transmission memory 1303. A transfer unit, which is not illustrated, transfers the print data stored in the transmission memory 1303 to the printer controller 202. The compressing unit 1302 may be a printer driver, for example. To compress data, some types of compression formats may be used, including JPEG, JBIG, and MH.

The printer controller 202 will be described. As illustrated in FIG. 3, the printer controller 202 includes a reception memory 1304, a decompressing unit 1305, a frame memory 1306, a color converting unit 1307 (an example of a gray-scale value input unit), dithering units 1308 to 1312 (an example of a dithering unit), line buffers 1313 to 1317, and a two-pass setting unit 1319 (an example of a pass information input unit).

The reception memory 1304 stores therein print data transferred from the PC 201. The reception memory 1304 may be a first-in first-out (FIFO) memory, for example.

The decompressing unit 1305 reads print data from the reception memory 1304 and decompresses the data. Thus, the decompressing unit 1305 restores bitmap image data of the respective colors including transparent image data and stores the image data in the frame memory 1306. The frame memory 1306 may be a dynamic random access memory (DRAM), for example.

The color converting unit 1307 reads bitmap data of the respective colors in the RGB color space other than the transparent image data from the frame memory 1306 and converts the bitmap data into data in the CMYK color space. The color converting unit 1307 can convert the bitmap data into data in the (UCR/BG) CMYK color space by: deriving complements of gray-scale values of RGB to convert the values into CMY; defining the minimum value of the respective gray scales of CMY as K; and subtracting the minimum value from the respective gray-scale values of CMY. The color converting unit 1307 reads the transparent image data from the frame memory 1306 but does not perform color conversion on the transparent image data. When it is necessary to rotate the image, the color converting unit 1307 changes the reading position of the bitmap data from the frame memory 1306, thereby rotating it.

The color converting unit 1307 inputs the gray-scale value of each pixel constituting the image data of K, the gray-scale value of each pixel constituting the image data of C, the gray-scale value of each pixel constituting the image data of M, the gray-scale value of each pixel constituting the image data of Y, and the gray-scale value of each pixel constituting the image data of S to the dithering units 1308 to 1312, respectively.

In the present embodiment, the color converting unit 1307 performs again the input operation described above in a case where the user returns a printed recording sheet discharged to the outside of the printer engine 203 to the paper feed tray and instructs reprinting. In this case, the color converting unit 1307 inputs again the gray-scale value of each pixel constituting the image data of K, the gray-scale value of each pixel constituting the image data of C, the gray-scale value of each pixel constituting the image data of M, the gray-scale value of each pixel constituting the image data of Y, and the gray-scale value of each pixel constituting the image data of S to the dithering units 1308 to 1312, respectively, based on an instruction issued from a central processing unit (CPU), which is not illustrated, of the printer controller 202.

Alternatively, the color converting unit 1307 may perform the input operation using pass information input from the two-pass setting unit 1319, which will be described later. In this case, the color converting unit 1307 inputs the gray-scale value of each pixel constituting the image data of K, the gray-scale value of each pixel constituting the image data of C, and the gray-scale value of each pixel constituting the image data of M to the dithering units 1308 to 1310, respectively in the first pass. Subsequently, the color converting unit 1307 inputs the gray-scale value of each pixel constituting the image data of M, the gray-scale value of each pixel constituting the image data of Y, and the gray-scale value of each pixel constituting the image data of S to the dithering units 1310 to 1312, respectively, in the second pass.

The two-pass setting unit 1319 inputs pass information to the dithering units 1308 to 1312. The pass information indicates whether printing is the first pass to perform printing on a yet-to-be-printed recording sheet or the second pass to perform reprinting on the same surface of the printed recording sheet.

The CPU of the printer controller 202 notifies the two-pass setting unit 1319 of whether printing to be performed by the printer engine 203 is the first pass or the second pass. Based on the notification, the two-pass setting unit 1319 inputs the pass information to the dithering units 1308 to 1312.

If print data transferred from the PC 201 to the printer controller 202 includes setting information for setting printing of two passes (printing in twice), for example, the CPU notifies the two-pass setting unit 1319 that printing to be performed by the printer engine 203 is the first pass. In addition, if the user returns a printed recording sheet discharged to the outside of the printer engine 203 to the paper feed tray and instructs reprinting, for example, the CPU notifies the two-pass setting unit 1319 that printing to be performed by the printer engine 203 is the second pass.

The dithering units 1308 to 1312 performs dithering on each pixel constituting the image data of K, each pixel constituting the image data of C, each pixel constituting the image data of M, each pixel constituting the image data of Y, and each pixel constituting the image data of S, respectively.

Figure 4:
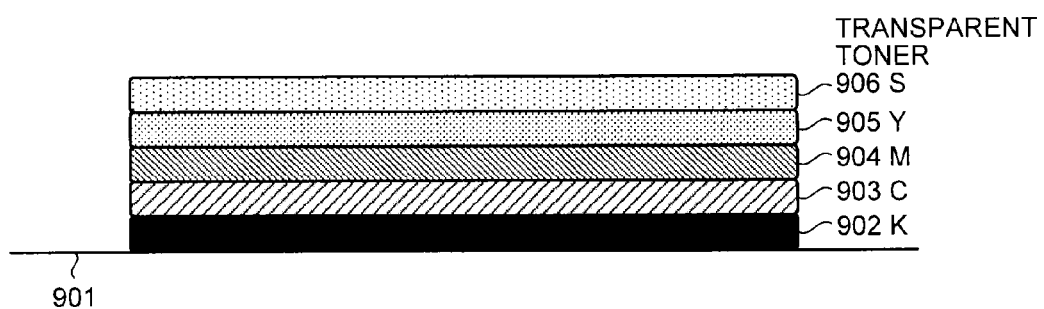
FIG. 4 is a view for explaining layers of toners according to the first embodiment.

To perform printing with five colors, which are K, C, M, Y, and S, the printer engine 203 transfers the toner of K onto a recording sheet 901 first to form a K layer 902 as illustrated in FIG. 4. The printer engine 203 then transfers the toner of C to form a C layer 903, transfers the toner of M to form an M layer 904, transfers the toner of Y to form a Y layer 905, and transfers the toner of S to form an S layer 906.

To perform printing in two passes, the printer engine 203 performs printing with a maximum of 100% of the toners of K and C and a maximum of 50% of the toner of M in the first pass, and performs printing with a maximum of 50% of the toner of M, which is the rest thereof, and a maximum of 100% of the toners of Y and S in the second pass.

Therefore, the dithering units 1308 to 1312 perform dithering on each pixel based on a dithering table retained therein, the input gray-scale value, and the input pass information.

When the pass information indicates the first pass, the dithering units 1308 and 1309 use the dithering table to compare the gray-scale value of each pixel to a corresponding value in the dithering table. If the gray-scale value is larger than the corresponding value, the dithering units 1308 and 1309 set a dot to be printed on that pixel. The dithering units 1308 and 1309 repeat the processing, thereby achieving area coverage modulation as a whole. In a case where the input pass information indicates the second pass, the dithering units 1308 and 1309 do not perform dithering.

When the pass information indicates the second pass, for example, the dithering units 1311 and 1312 use the dithering table to compare the gray-scale value of each pixel to a corresponding value in the dithering table. If the gray-scale value is larger than the corresponding value, the dithering units 1311 and 1312 set a dot to be printed on the pixel. The dithering units 1311 and 1312 repeat the processing, thereby achieving area coverage modulation as a whole. When the input pass information indicates the first pass, the dithering units 1311 and 1312 do not perform dithering.

To perform printing in two passes, the printer engine 203 prints a maximum of 50% of the toner of M in the first pass and a maximum of 50% of the toner of M, which is the rest thereof, in the second pass as described above. The dithering unit 1310 needs to perform dithering such that the amount of the toner of M printed by the printer engine 203 in the first pass is a maximum of 50% and the amount of the toner of M printed in second pass is a maximum of 50%, which is the rest thereof.

Figure 5:
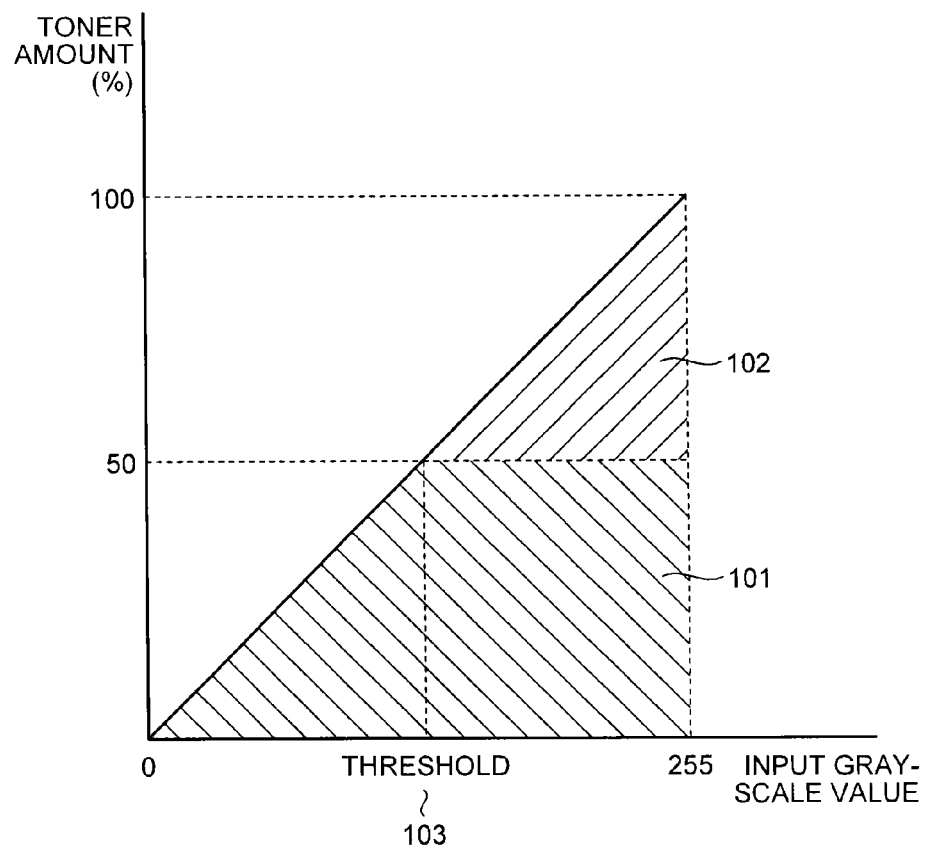
FIG. 5 is a graph for explaining the relation between an input gray-scale value of M and the amount of toner of M according to the first embodiment.

FIG. 5 is a graph for explaining the relation between the input gray-scale value of M and the amount of toner of M according to the first embodiment. In the example illustrated in FIG. 5, the abscissa axis indicates the input gray-scale value, whereas the ordinate axis indicates the toner amount (%). Because the input gray-scale value is assumed to be expressed by 8 bits in the first embodiment, the toner amount corresponding to a minimum value of 0 is 0%, whereas the toner amount corresponding to a maximum value of 255 is 100%.

In the graph illustrated in FIG. 5, the toner amount of a maximum of 50% to be printed in the first pass is represented by an area 101, whereas the toner amount of a maximum of 50%, which is the rest thereof, to be printed in the second pass is represented by an area 102.

If the toner amount is equal to or smaller than 50%, that is, if the input gray-scale value is equal to or smaller than a threshold of 103, the printer engine 203 can print all the toner in the first pass and need not print any toner in the second pass.

By contrast, if the toner amount is larger than 50%, that is, if the input gray-scale value is larger than a threshold of 103, the printer engine 203 can print only a maximum of 50% of the toner in the first pass. The printer engine 203 needs to print the rest of the toner (an amount obtained by reducing the original toner amount by 50%) in the second pass.

While a threshold may be changed from 103 to 127, for example, the threshold is not limited thereto.

Therefore, the dithering unit 1310 performs dithering on each pixel based on the dithering table and the threshold retained therein, the input gray-scale value, and the input pass information.

Specifically, when the gray-scale value is equal to or smaller than the threshold and the pass information indicates the first pass, if the gray-scale value is equal to or larger than a corresponding value in the dithering table, the dithering unit 1310 sets a dot to be printed on a pixel of the gray-scale value. In this case, by using the gray-scale value without any change, the dithering unit 1310 performs normal dithering (refer to the first pass and smaller than the threshold in FIG. 6). The dithering unit 1310 repeats the processing, thereby achieving area coverage modulation as a whole.

When the gray-scale value is larger than the threshold and the pass information indicates the first pass, if the gray-scale value is equal to or larger than a corresponding value in the dithering table and the corresponding value is equal to or smaller than the threshold, the dithering unit 1310 sets a dot to be printed on a pixel of the gray-scale value. In this case, by using the threshold as the gray-scale value, the dithering unit 1310 performs normal dithering (refer to the first pass and equal to or larger than the threshold in FIG. 6). The dithering unit 1310 repeats the processing, thereby achieving area coverage modulation as a whole.

When the gray-scale value is equal to or smaller than the threshold and the pass information indicates the first pass, if the gray-scale value is smaller than a corresponding value in the dithering table, the dithering unit 1310 sets no dot to be printed on a pixel of the gray-scale value. When the gray-scale value is larger than the threshold and the pass information indicates the first pass, if the gray-scale value is smaller than a corresponding value in the dithering table or if the corresponding value is larger than the threshold, the dithering unit 1310 sets no dot to be printed on a pixel of the gray-scale value.

When the gray-scale value is larger than the threshold and the pass information indicates the second pass, if the gray-scale value is equal to or larger than a corresponding value in the dithering table and the corresponding value is larger than the threshold, the dithering unit 1310 sets a dot to be printed on a pixel of the gray-scale value. In this case, by using the gray-scale value without any change, the dithering unit 1310 performs normal dithering (refer to the second pass and equal to or larger than the threshold in FIG. 6). In this case, however, it is necessary to mask the pixel on which the dot is set to be printed in the first pass (to set no dot thereon). The dithering unit 1310 repeats the processing, thereby achieving area coverage modulation as a whole.

When the gray-scale value is equal to or smaller than the threshold and the pass information indicates the second pass, the dithering unit 1310 sets no dot to be printed on a pixel of the gray-scale value. When the gray-scale value is larger than the threshold and the pass information indicates the second pass, if the gray-scale value is smaller than a corresponding value in the dithering table or if the corresponding value is smaller than the threshold, the dithering unit 1310 sets no dot to be printed on a pixel of the gray-scale value.

FIG. 7 is a view of an example of the dithering table retained in the dithering units 1308 to 1312 according to the first embodiment.

In the example illustrated in FIG. 7, the dithering table is provided as a 4×4 (16) matrix and contains values from 15 to 255, which increase by 16. The dithering units 1308 to 1312 repeatedly connect the 4×4 dithering table in vertical and lateral directions, thereby repeating the processing (periodic boundary).

Given $D_{i,j}$ denotes the corresponding value of a pixel (i,j) in the dithering table, and A(i,j) denotes the gray-scale value of the pixel (i,j), if $A(i,j) \geq D_{i,j}$ is satisfied, the dithering units 1308 to 1312 sets a dot to be printed on the pixel (i,j), for example.

FIG. 8 is a view of a result of dithering performed by the dithering unit 1310 in a case where the dithering table illustrated in FIG. 7 is used, the threshold is set to 100, and the input gray-scale value (area gray-scale value) is set to 80.

In the example illustrated in FIG. 8, the dithering unit 1310 sets a dot to be printed on pixels corresponding to 15, 31, 47, 63, and 79 in the dithering table in the first pass and sets no dot to be printed on any pixel in the second pass. Therefore, in the final print result, the toner is printed on the pixels corresponding to 15, 31, 47, 63, and 79 in the dithering table.

FIG. 9 is a view of a result of dithering performed by the dithering unit 1310 in a case where the dithering table illustrated in FIG. 7 is used, the threshold is set to 100, and the input gray-scale value (area gray-scale value) is set to 150.

In the example illustrated in FIG. 9, the dithering unit 1310 sets a dot to be printed on pixels corresponding to 15, 31, 47, 63, 79, and 95 in the dithering table in the first pass and sets a dot to be printed on pixels corresponding to 111, 127, and 143 in the dithering table in the second pass. Therefore, in the final print result, the toner is printed on the pixels corresponding to 15, 31, 47, 63, 79, 95, 111, 127, and 143 in the dithering table.

FIG. 10 and FIGS. 11A to 11D are diagrams of an exemplary logic circuit configuration of the dithering unit 1310 according to the first embodiment.

Figure 11A:
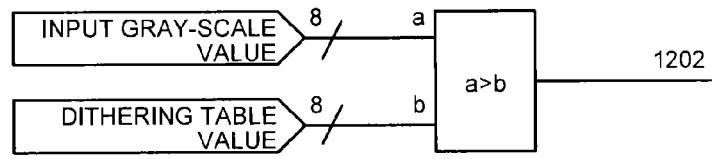
FIG. 11A is a diagram of an exemplary logic circuit configuration of the dithering unit according to the first embodiment.

The circuit illustrated in FIG. 11A compares the input gray-scale value and the dithering table value, thereby outputting an output 1202. This corresponds to the input gray-scale value in the first pass in a case where the input gray-scale value is equal to or smaller than the threshold.

Figure 11B:
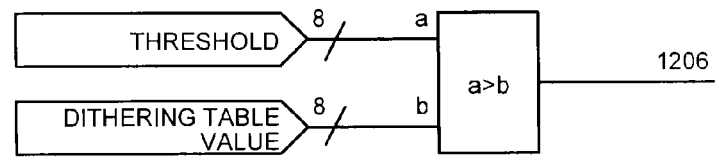
FIG. 11B is a diagram of an exemplary logic circuit configuration of the dithering unit according to the first embodiment.

The circuit illustrated in FIG. 11B compares the threshold and the dithering table value, thereby outputting an output 1206. This corresponds to the input gray-scale value in the first pass in a case where the input gray-scale value is larger than the threshold.

Figure 11C:
FIG. 11C is a diagram of an exemplary logic circuit configuration of the dithering unit according to the first embodiment.

The circuit illustrated in FIG. 11C is fixed at 0 and outputs an output 1204. This corresponds to the input gray-scale value in the second pass in a case where the input gray-scale value is equal to or smaller than the threshold.

Figure 11D:
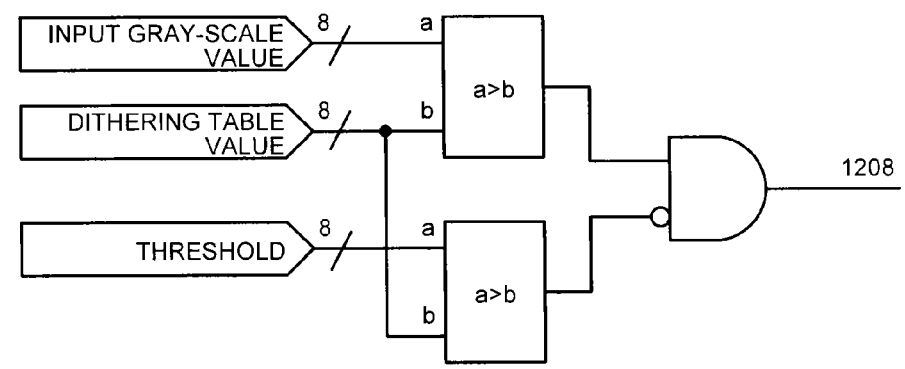
FIG. 11D is a diagram of an exemplary logic circuit configuration of the dithering unit according to the first embodiment.

The circuit illustrated in FIG. 11D masks a portion of the first pass in a case where the input gray-scale value is equal to or larger than the threshold based on a normal dithering operation for comparing the input gray-scale value and the dithering table value, thereby outputting an output 1208. This corresponds to the input gray-scale value in the second pass in a case where the input gray-scale value is larger than the threshold.

Figure 10:
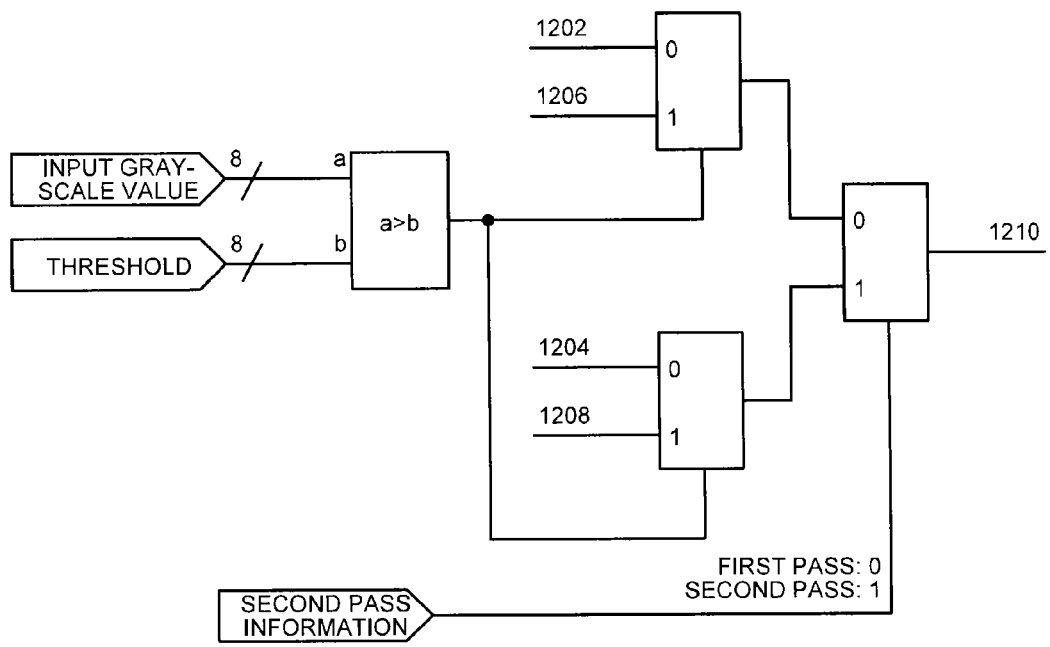
FIG. 10 is a diagram of an exemplary logic circuit configuration of the dithering unit according to the first embodiment.

The circuit illustrated in FIG. 10 makes a selection from the outputs 1202, 1204, 1206, and 1208 based on the pass information indicating whether the printing is the first pass or the second pass and on information indicating whether the input gray-scale value is larger than the threshold. Thus, the circuit outputs a final output 1210, that is, a determination result as to whether a dot is set to be printed on a corresponding pixel.

The dithering unit 1310 also includes a logic circuit configuration for normal dithering besides the logic circuit configurations illustrated in FIG. 10 and FIGS. 11A to 11D. To perform printing in one pass, the dithering unit 1310 uses the logic circuit configuration.

To perform dithering in two passes, the dithering units 1308, 1309, 1311, and 1312 may include the logic circuit configurations illustrated in FIG. 10 and FIGS. 11A to 11D.

The data (dot data) of each pixel on which dithering is performed by the dithering units 1308 to 1312 is transmitted to the line buffers 1313 to 1317, respectively, and is transferred to the printer engine 203 as video data for driving a laser.

As described above, in the first embodiment, dithering of a single color can be performed in twice. This makes it possible to perform printing of a developer of the single color in twice. This can ensure the color reproduction range and prevent reduction in the image quality even in a case where the number of colors of developers is an odd number, such as 5. Thus, according to the first embodiment, printing can be performed in twice.

Second Embodiment

A second embodiment describes a case where a dithering unit 1310 performs dithering using a first threshold and a second threshold smaller than the first threshold. The following mainly describes differences between the first embodiment and the second embodiment and omits the explanation of components having the same functions as those in the first embodiment.

In the second embodiment, the dithering unit 1310 performs dithering using the first threshold in the first pass and using the second threshold in the second pass. Because the second threshold is smaller than the first threshold, some of dots are set to be printed both in the first pass and the second pass. Thus, printing is performed in an overlapping manner.

Figure 12:
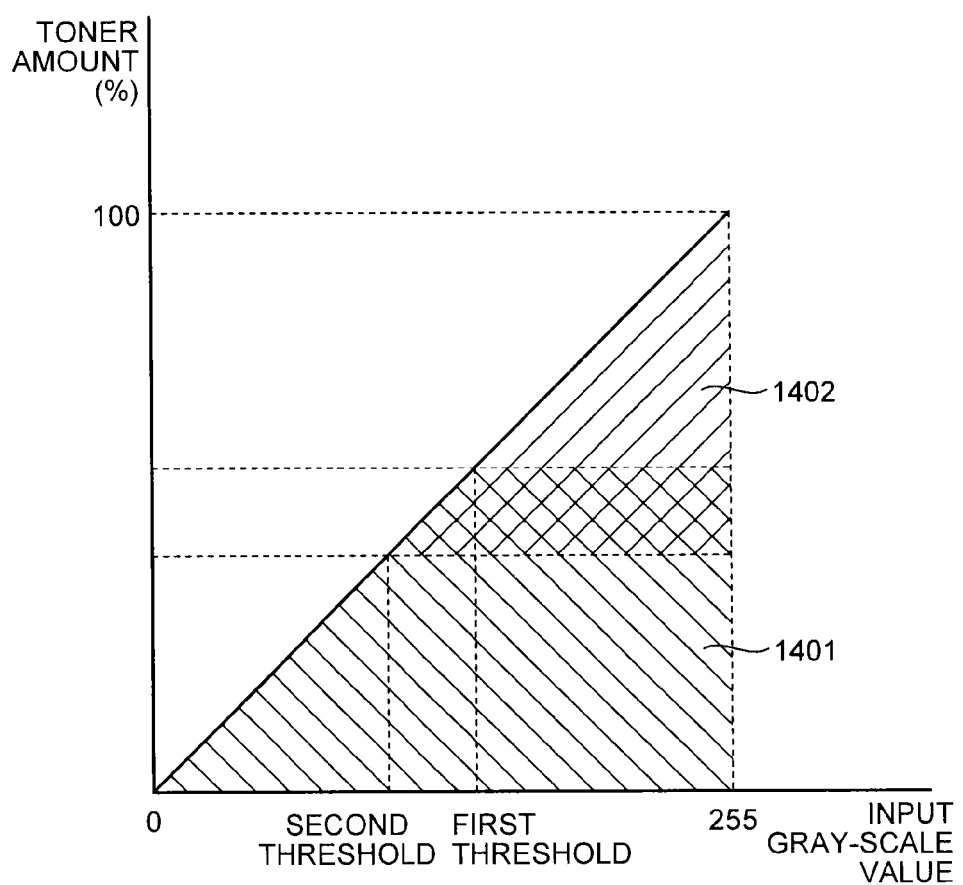
FIG. 12 is a diagram for explaining toner overlapping printing according to a second embodiment.

In a case where a printer engine 203 can fix a maximum of approximately 260% of a developer in one fixing, for example, the printer engine 203 can print 0 to 60% of a toner in the first pass and 40 to 100% of the toner in the second pass. Thus, the printer engine 203 can perform printing in an overlapping manner by 20% (refer to FIG. 12).

In printing of the first pass, the toner of M forms the uppermost layer and has transfer efficiency lower than that of K and C. In the second embodiment, overlapping printing of M can be performed in view of the low transfer efficiency of M.

In the second embodiment, when the gray-scale value is equal to or smaller than the first threshold and the pass information indicates the first pass, if the gray-scale value is equal to or larger than a corresponding value in the dithering table, the dithering unit 1310 sets a dot to be printed on a pixel of the gray-scale value. In this case, by using the gray-scale value without any change, the dithering unit 1310 performs normal dithering.

When the gray-scale value is larger than the first threshold and the pass information indicates the first pass, if the gray-scale value is equal to or larger than a corresponding value in the dithering table and the corresponding value is equal to or smaller than the first threshold, the dithering unit 1310 sets a dot to be printed on a pixel of the gray-scale value. In this case, by using the first threshold as the gray-scale value, the dithering unit 1310 performs normal dithering.

When the gray-scale value is equal to or smaller than the first threshold and the pass information indicates the first pass, if the gray-scale value is smaller than a corresponding value in the dithering table, the dithering unit 1310 sets no dot to be printed on a pixel of the gray-scale value. When the gray-scale value is larger than the first threshold and the pass information indicates the first pass, if the gray-scale value is smaller than a corresponding value in the dithering table or if the corresponding value is larger than the first threshold, the dithering unit 1310 sets no dot to be printed on a pixel of the gray-scale value.

When the gray-scale value is larger than the second threshold and the pass information indicates the second pass, if the gray-scale value is equal to or larger than a corresponding value in the dithering table and the corresponding value is larger than the second threshold, the dithering unit 1310 sets a dot to be printed on a pixel of the gray-scale value. In this case, by using the gray-scale value without any change, the dithering unit 1310 performs normal dithering. In this case, however, it is necessary to mask the pixel on which the dot is set to be printed in the first pass.

When the gray-scale value is equal to or smaller than the second threshold and the pass information indicates the second pass, the dithering unit 1310 sets no dot to be printed on a pixel of the gray-scale value. When the gray-scale value is larger than the second threshold and the pass information indicates the second pass, if the gray-scale value is smaller than a corresponding value in the dithering table or if the corresponding value is smaller than the second threshold, the dithering unit 1310 sets no dot to be printed on a pixel of the gray-scale value.

FIG. 13 and FIGS. 14A to 14D are diagrams of an exemplary logic circuit configuration of the dithering unit 1310 according to the second embodiment.

Figure 14A:
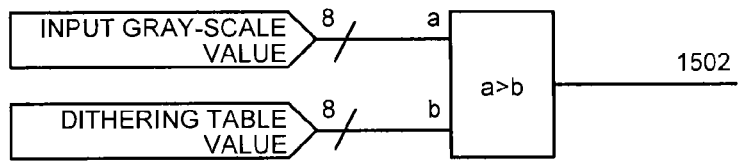
FIG. 14A is a diagram of an exemplary logic circuit configuration of the dithering unit according to the second embodiment.

The circuit illustrated in FIG. 14A compares the input gray-scale value and the dithering table value, thereby outputting an output 1502. This corresponds to the input gray-scale value in the first pass in a case where the input gray-scale value is equal to or smaller than the first threshold.

Figure 14B:
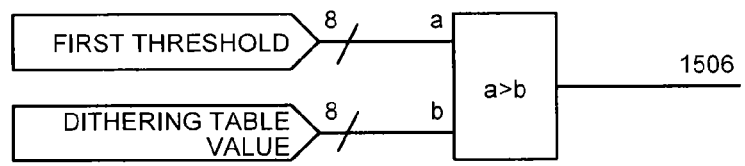
FIG. 14B is a diagram of an exemplary logic circuit configuration of the dithering unit according to the second embodiment.

The circuit illustrated in FIG. 14B compares the first threshold and the dithering table value, thereby outputting an output 1506. This corresponds to the input gray-scale value in the first pass in a case where the input gray-scale value is larger than the first threshold.

Figure 14C:
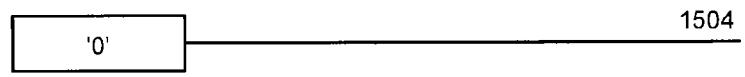
FIG. 14C is a diagram of an exemplary logic circuit configuration of the dithering unit according to the second embodiment.

The circuit illustrated in FIG. 14C is fixed at 0 and outputs an output 1504. This corresponds to the input gray-scale value in the second pass in a case where the input gray-scale value is equal to or smaller than the second threshold.

Figure 14D:
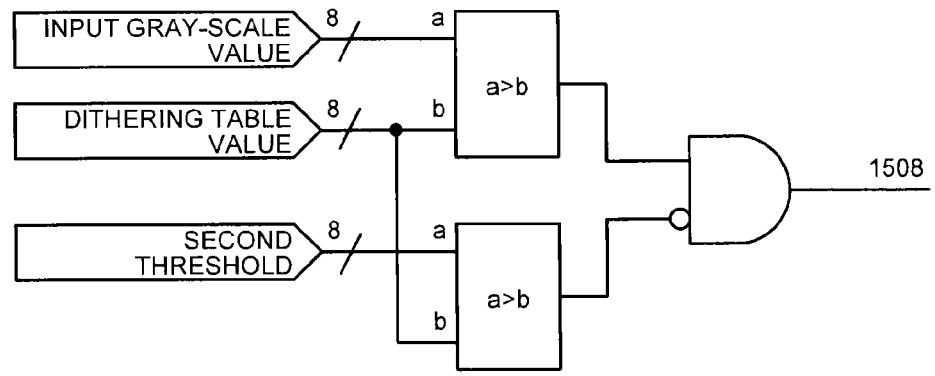
FIG. 14D is a diagram of an exemplary logic circuit configuration of the dithering unit according to the second embodiment.

The circuit illustrated in FIG. 14D masks a portion of the first pass in a case where the input gray-scale value is equal to or larger than the second threshold based on a normal dithering operation for comparing the input gray-scale value and the dithering table value, thereby outputting an output 1508. This corresponds to the input gray-scale value in the second pass in a case where the input gray-scale value is larger than the second threshold.

Figure 13:
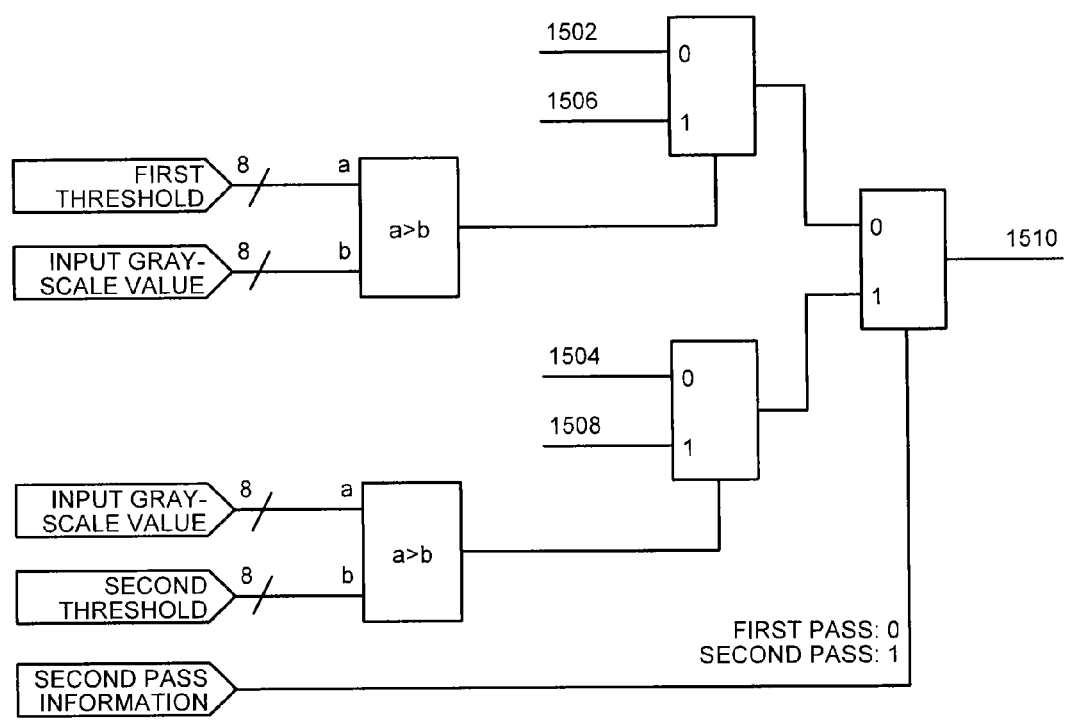
FIG. 13 is a diagram of an exemplary logic circuit configuration of a dithering unit according to the second embodiment.

The circuit illustrated in FIG. 13 makes a selection from the outputs 1502, 1504, 1506, and 1508 based on the pass information indicating whether the printing is the first pass or the second pass, on information indicating whether the input gray-scale value is larger than the first threshold, and on information indicating whether the input gray-scale value is larger than the second threshold. Thus, the circuit outputs a final output 1510, that is, a determination result as to whether a dot is set to be printed on a corresponding pixel.

As described above, in the second embodiment, too, dithering of a single color can be performed in twice. This makes it possible to perform printing of a developer of the single color in twice. This can ensure the color reproduction range and prevent reduction in the image quality even in a case where the number of colors of developers is an odd number, such as 5. Thus, according to the second embodiment, printing can be performed in twice. According to the second embodiment, in particular, printing can be performed in view of deterioration in the transfer efficiency of the uppermost layer in the first pass.

Third Embodiment

A third embodiment describes a case where a dithering unit 1310 performs dithering using the most significant bit of the gray-scale value. The following mainly describes differences between the first embodiment and the third embodiment and omits the explanation of components having the same functions as those in the first embodiment.

In the third embodiment, the dithering unit 1310 performs dithering using the most significant bit of the gray-scale value instead of the threshold. Thus, the dithering unit 1310 requires no register to retain the threshold, making it possible to reduce cost and deal with constraints on its hardware configuration (constraints on a logic scale).

Figure 15:
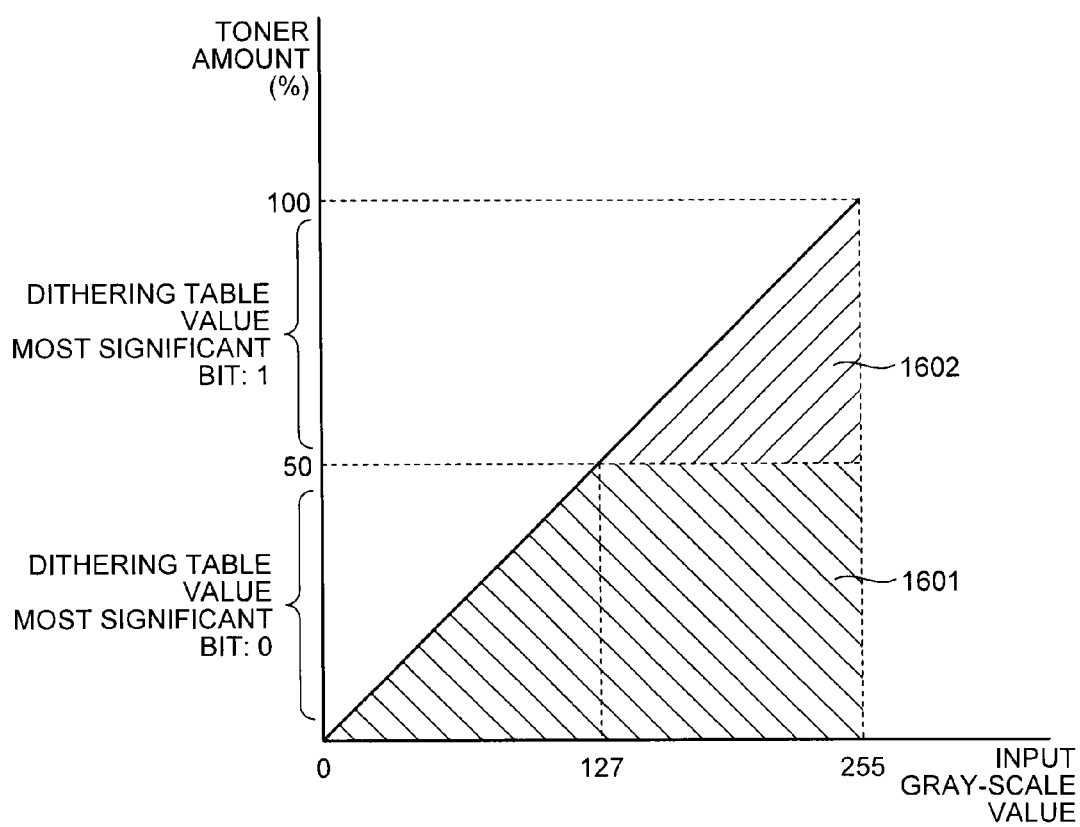
FIG. 15 is a graph for explaining the relation between an input gray-scale value of M and the amount of toner of M according to a third embodiment of the present invention.

FIG. 15 is a graph for explaining the relation between the input gray-scale value of M and the amount of toner of M according to the third embodiment. In the graph illustrated in FIG. 15, the toner amount of a maximum of 50% to be printed in the first pass is represented by an area 1601, whereas the toner amount of a maximum of 50%, which is the rest thereof, to be printed in the second pass is represented by an area 1602.

If the toner amount is equal to or smaller than 50%, that is, if the input gray-scale value is smaller than 128, which is the minimum value of the gray-scale value in the case of the most significant bit (8 bits) of the input gray-scale value being 1, the printer engine 203 can print all the toner in the first pass and need not print any toner in the second pass.

By contrast, if the toner amount is larger than 50%, that is, if the input gray-scale value is equal to or larger than 128, which is the minimum value of the gray-scale value in the case of the most significant bit (8 bits) of the input gray-scale value being 1, the printer engine 203 can print only a maximum of 50% of the toner in the first pass. The printer engine 203 needs to print the rest of the toner (an amount obtained by reducing the original toner amount by 50%) in the second pass.

In the third embodiment, in a case where the most significant bit of the gray-scale value is 0 and the pass information indicates the first pass, if the gray-scale value is equal to or larger than a corresponding value in the dithering table, the dithering unit 1310 sets a dot to be printed on a pixel of the gray-scale value.

In a case where the most significant bit of the gray-scale value is 1 and the pass information indicates the first pass, if the gray-scale value is equal to or larger than a corresponding value in the dithering table and the corresponding value is smaller than the minimum value of the gray-scale value in the case of the most significant bit being 1, the dithering unit 1310 sets a dot to be printed on a pixel of the gray-scale value.

In a case where the most significant bit of the gray-scale value is 0 and the pass information indicates the first pass, if the gray-scale value is smaller than a corresponding value in the dithering table, the dithering unit 1310 sets no dot is to be printed on a pixel of the gray-scale value. In a case where the most significant bit of the gray-scale value is 1 and the pass information indicates the first pass, if the gray-scale value is smaller than a corresponding value in the dithering table or if the corresponding value is equal to or larger than the minimum value of the gray-scale value in the case of the most significant bit being 1, the dithering unit 1310 sets no dot is to be printed on a pixel of the gray-scale value.

In a case where the most significant bit of the gray-scale value is 1 and the pass information indicates the second pass, if the gray-scale value is equal to or larger than a corresponding value in the dithering table and the corresponding value is equal to or larger than the minimum value of the gray-scale value in the case of the most significant bit being 1, the dithering unit 1310 sets a dot to be printed on a pixel of the gray-scale value.

In a case where the most significant bit of the gray-scale value is 0 and the pass information indicates the second pass, the dithering unit 1310 sets no dot to be printed on a pixel of the gray-scale value. In a case where the most significant bit of the gray-scale value is 1 and the pass information indicates the second pass, if the gray-scale value is smaller than a corresponding value in the dithering table or if the corresponding value is smaller than the minimum value of the gray-scale value in the case of the most significant bit being 1, the dithering unit 1310 sets no dot to be printed on a pixel of the gray-scale value.

FIG. 16 and FIGS. 17A to 17D are diagrams of an exemplary logic circuit configuration of the dithering unit 1310 according to the third embodiment.

Figure 17A:
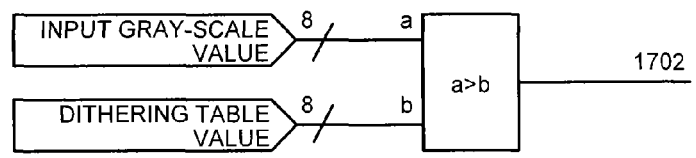
FIG. 17A is a diagram of an exemplary logic circuit configuration of the dithering unit according to the third embodiment.

The circuit illustrated in FIG. 17A compares the input gray-scale value and the dithering table value, thereby outputting an output 1702. This corresponds to the input gray-scale value in the first pass in the case of the most significant bit of the input gray-scale value being 0.

Figure 17B:
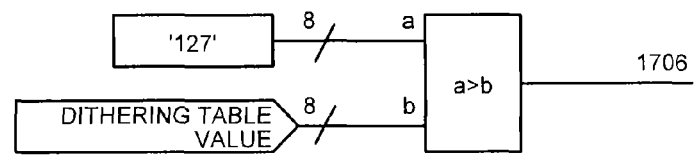
FIG. 17B is a diagram of an exemplary logic circuit configuration of the dithering unit according to the third embodiment.

The circuit illustrated in FIG. 17B compares a value (127) obtained by subtracting 1 from the minimum value of the gray-scale value in the case of the most significant bit of the input gray scale value being 1 and the dithering table value, thereby outputting an output 1706. This corresponds to the input gray-scale value in the first pass in the case of the most significant bit of the input gray-scale value being 1.

Figure 17C:
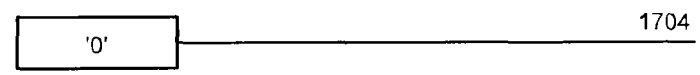
FIG. 17C is a diagram of an exemplary logic circuit configuration of the dithering unit according to the third embodiment.

The circuit illustrated in FIG. 17C is fixed at 0 and outputs an output 1704. This corresponds to the input gray-scale value in the second pass in the case of the most significant bit of the input gray-scale value being 0.

Figure 17D:
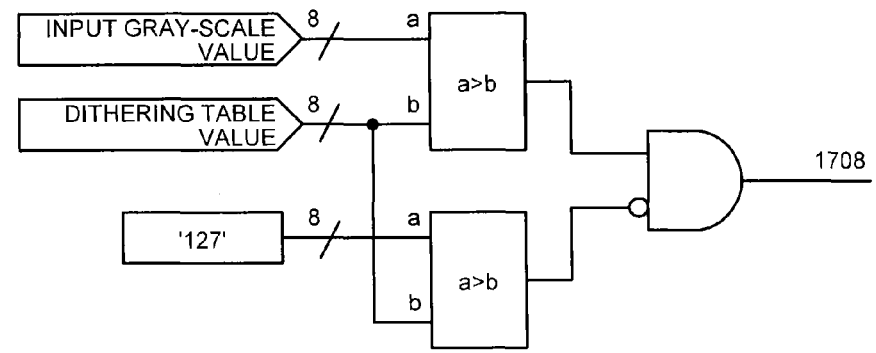
FIG. 17D is a diagram of an exemplary logic circuit configuration of the dithering unit according to the third embodiment.

The circuit illustrated in FIG. 17D masks a portion of the first pass in the case of the most significant bit of the input gray-scale value being 1 based on a normal dithering operation for comparing the input gray-scale value and the dithering table value, thereby outputting an output 1708. This corresponds to the input gray-scale value in the second pass in the case of the most significant bit of the input gray-scale value being 1.

Figure 16:
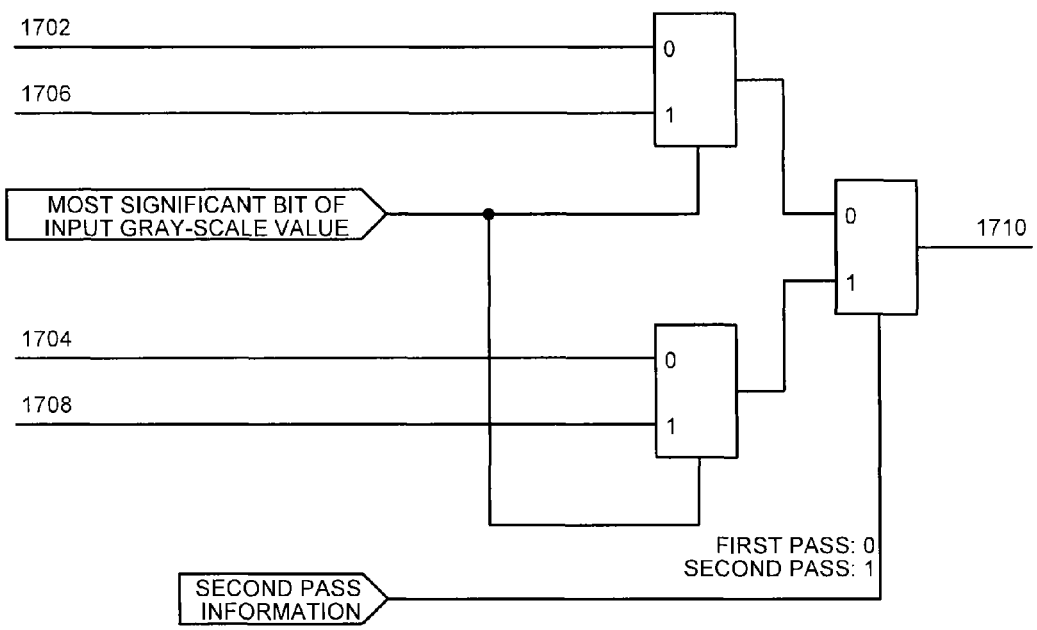
FIG. 16 is a diagram of an exemplary logic circuit configuration of a dithering unit according to the third embodiment.

The circuit illustrated in FIG. 16 makes a selection from the outputs 1702, 1704, 1706, and 1708 based on the pass information indicating whether the printing is the first pass or the second pass and on information indicating whether the most significant bit of the input gray-scale value is 1 or 0. Thus, the circuit outputs a final output 1710, that is, a determination result as to whether a dot is to be on a corresponding pixel.

As described above, in the third embodiment, too, dithering of a single color can be performed in twice. This makes it possible to perform printing of a developer of the single color in twice. This can ensure the color reproduction range and prevent reduction in the image quality even in a case where the number of colors of developers is an odd number, such as 5. Thus, according to the third embodiment, printing can be performed in twice. According to the third embodiment, in particular, no register is required to retain the threshold. This makes it possible to reduce cost and deal with constraints on its hardware configuration (constraints on a logic scale). The third embodiment is effectively used for small color printers.

Fourth Embodiment

A fourth embodiment describes a case where a display image representing a print result obtained in the first pass is displayed. The following mainly describes differences between the first embodiment and the fourth embodiment and omits the explanation of components having the same functions as those in the first embodiment.

In printing in two passes, a print result obtained in the first pass represents the printed toners of K, C, and a part of M. Because the print result is an unfinished printed material, it is difficult for the user to determine whether the print result is correct.

To address this, in the fourth embodiment, a display image representing a print result obtained in the first pass is displayed to thereby facilitate the user's determining whether the print result obtained in the first pass is correct. Furthermore, in the fourth embodiment, the user is allowed to select a paper feed tray to be used in the second pass. This enables a printer engine 203 to determine from which paper feed tray it conveys a sheet to perform printing of the second pass. Alternatively, the printer engine 203 may specify a paper feed tray to be used in the second pass.

Figure 18:
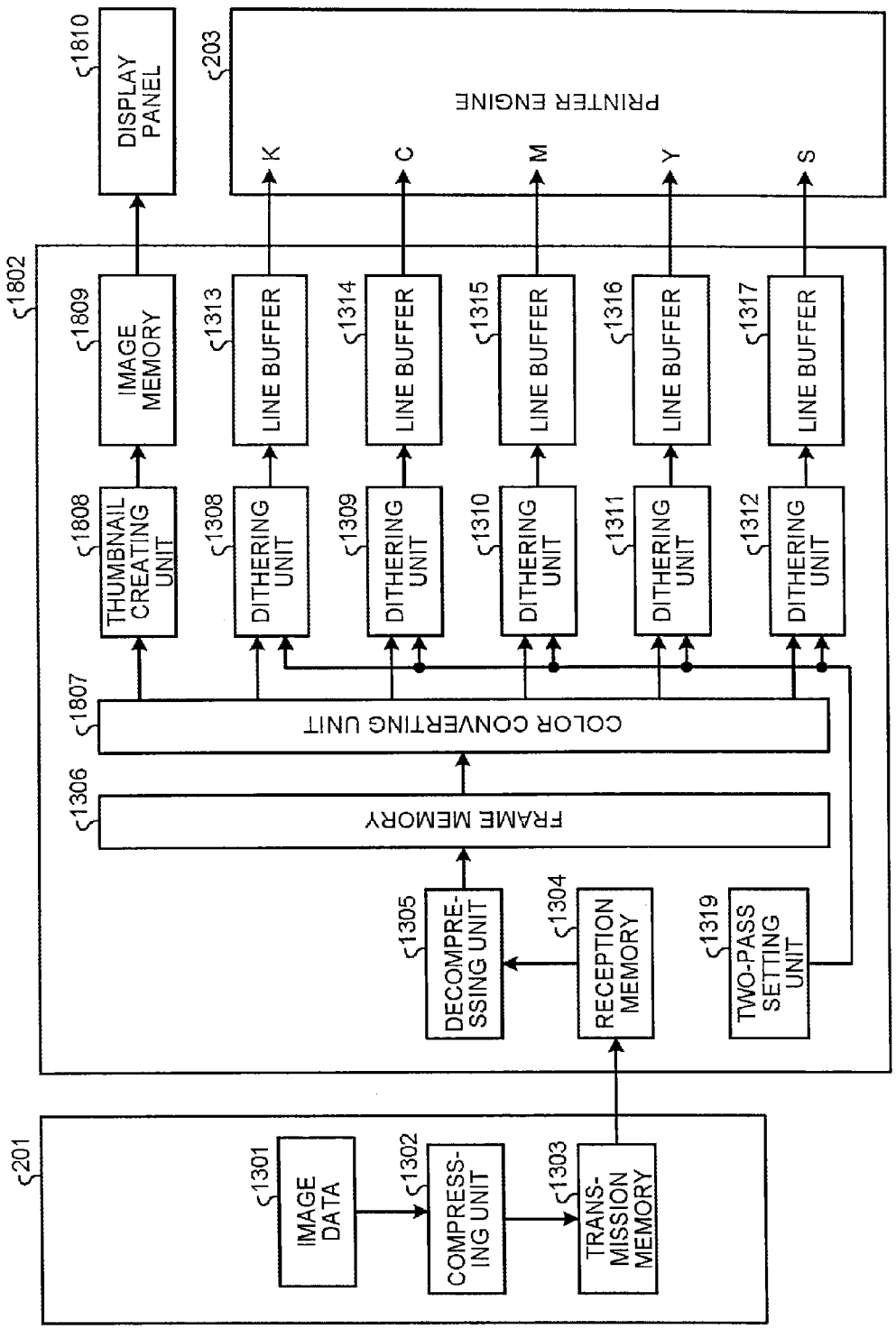
FIG. 18 is a schematic of an exemplary configuration of a printer controller according to a fourth embodiment.

FIG. 18 is a schematic of an exemplary configuration of a printer controller 1802 according to the fourth embodiment. As illustrated in FIG. 18, the printer controller 1802 is different from that of the first embodiment in that the printer controller 1802 includes a color converting unit 1807, a thumbnail creating unit 1808 (an example of a display image creating unit), an image memory 1809, and a display panel 1810 (an example of a display unit and a selecting unit).

The color converting unit 1807 inputs image data of K, image data of C, and image data of M to the thumbnail creating unit 1808.

If the pass information indicates the first pass, the thumbnail creating unit 1808 creates a display image representing a print result obtained in the first pass. Specifically, if the pass information indicates the first pass, the thumbnail creating unit 1808 creates a thumbnail image representing a print result obtained in the first pass using the image data of K, the image data of C, and the image data of M. If the toner amount of the image data of M is equal to or larger than 50%, the thumbnail creating unit 1808 creates a thumbnail image in view of the toner amount to be 50%.

Because the image data of K, the image data of C, and the image data of M are multi-valued data (K, C, and M) of 8 bits per pixel, the thumbnail creating unit 1808 can create a bitmap without any change. In terms of the capacity of thumbnail image data, the thumbnail creating unit 1808 may convert the image data into data in a JPEG or GIF format, which is commonly used. Besides this, the thumbnail creating unit 1808 may thin pixels or reduce the image.

If the pass information indicates the second pass, the thumbnail creating unit 1808 may create a thumbnail image representing a print result obtained in the second pass.

The image memory 109 stores therein a thumbnail image.

The display panel 1810 displays the thumbnail image stored in the image memory 109. The display panel 1810 displays the thumbnail image after the printing of the first pass, for example. At this time, the display panel 1810 may allow the user to select a paper feed tray to be used in the second pass. Alternatively, the display panel 1810 may specify a paper feed tray to be used in the second pass in view of the sheet type, the sheet thickness, and the sheet size, for example.

As described above, in the fourth embodiment, too, dithering of a single color can be performed in twice. This makes it possible to perform printing of a developer of the single color in twice. This can ensure the color reproduction range and prevent reduction in the image quality even in a case where the number of colors of developers is an odd number, such as 5. Thus, according to the fourth embodiment, printing can be performed in twice. The fourth embodiment in particular facilitates the user's determination as to whether the print result obtained in the first pass is correct. Furthermore, the fourth embodiment enables the printer engine 203 to determine from which paper feed tray it conveys a sheet to perform printing of the second pass.

Modification

The present invention is not limited to the embodiments above, and various types of modifications may be made. The embodiments above may provide at least a part of the functions (e.g., the dithering units 1308 to 1312) included in the printer controllers 202 and 1802 outside thereof (e.g., on a cloud) and provide the printer controllers 202 and 1802 as a system.

Hardware Configuration

The printer controllers 203 and 1803 according to the embodiments above include a control device such as a CPU, a memory such as a read only memory (ROM) and a random access memory (RAM), an external storage device such as a hard disk drive (HDD), a display device such as a display, an input device such as a keyboard and a mouse, and a communication device such as a communication interface (I/F). The printer controllers 203 and 1803 have a hardware configuration using a typical computer.

The computer program executed by the printer controllers 203 and 1803 according to the embodiments above is stored and provided in a computer-readable recording medium such as a compact disc read only memory (CD-ROM), a compact disc recordable (CD-R), a memory card, a digital versatile disc (DVD), and a flexible disk (FD), as an installable or executable file.

The computer program executed by the printer controllers 203 and 1803 according to the embodiments above may be stored in a computer connected to a network such as the Internet and provided by being downloaded via the network. The computer program executed by the printer controllers 203 and 1803 according to the embodiments above may be provided or distributed via a network such as the Internet. The computer program executed by the printer controllers 203 and 1803 according to the embodiments above may be embedded and provided in a ROM, for example.

The computer program executed by the printer controllers 203 and 1803 according to the embodiments above has a module configuration for providing each unit described above on a computer. In actual hardware, the CPU reads and executes the computer program from the HDD in the RAM, thereby providing each unit on the computer.

The present invention can perform dithering of a single color in twice.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a dithering unit that retains a dithering table and a threshold, the dithering table providing a matrix of pixels, each of the pixels having a corresponding value;
   a gray-scale value input unit that inputs, to the dithering unit, a gray-scale value of each pixel constituting image data of a predetermined color; and
   a pass information input unit that inputs, to the dithering unit, pass information indicating whether printing is a first pass to perform printing on a recording medium yet to be printed or a second pass to perform reprinting on the same surface of the recording medium already subjected to printing,
   wherein the dithering unit determines whether a dot is printed or not on each of the pixels in the matrix based on the pass information and by comparing magnitudes of the corresponding value, the threshold, and the gray-scale value with one another.

2. The image processing apparatus according to claim 1, wherein
   when the gray-scale value is equal to or smaller than the threshold and the pass information indicates the first pass, and when the gray-scale value is equal to or larger than a corresponding value in the dithering table, the dithering unit sets a dot to be printed on a pixel of the gray-scale value,
   when the gray-scale value is larger than the threshold and the pass information indicates the first pass, and when the gray-scale value is equal to or larger than a corresponding value in the dithering table and the corresponding value is equal to or smaller than the threshold, the dithering unit sets a dot to be printed on a pixel of the gray-scale value, and
   when the gray-scale value is larger than the threshold and the pass information indicates the second pass, and when the gray-scale value is equal to or larger than a corresponding value in the dithering table and the corresponding value is larger than the threshold, the dithering unit sets a dot to be printed on a pixel of the gray-scale value.

3. The image processing apparatus according to claim 2, wherein
   when the gray-scale value is equal to or smaller than the threshold and the pass information indicates the first pass, and when the gray-scale value is smaller than a corresponding value in the dithering table, the dithering unit sets no dot to be printed on a pixel of the gray-scale value,
   when the gray-scale value is equal to or smaller than the threshold and the pass information indicates the second pass, the dithering unit sets no dot to be printed on a pixel of the gray-scale value,
   when the gray-scale value is larger than the threshold and the pass information indicates the first pass, and when the gray-scale value is smaller than a corresponding value in the dithering table or when the corresponding value is larger than the threshold, the dithering unit sets no dot to be printed on a pixel of the gray-scale value, and
   when the gray-scale value is larger than the threshold and the pass information indicates the second pass, and when the gray-scale value is smaller than a corresponding value in the dithering table or when the corresponding value is smaller than the threshold, the dithering unit sets no dot to be printed on a pixel of the gray-scale value.

4. The image processing apparatus according to claim 1, wherein
   the dithering unit further retains a first threshold and a second threshold smaller than the first threshold,
   when the gray-scale value is equal to or smaller than the first threshold and the pass information indicates the first pass, and when the gray-scale value is equal to or larger than a corresponding value in the dithering table, the dithering unit sets a dot to be printed on a pixel of the gray-scale value,
   when the gray-scale value is larger than the first threshold and the pass information indicates the first pass, and when the gray-scale value is equal to or larger than a corresponding value in the dithering table and the corresponding value is equal to or smaller than the first threshold, the dithering unit sets a dot to be printed on a pixel of the gray-scale value, and
   when the gray-scale value is larger than the second threshold and the pass information indicates the second pass, and when the gray-scale value is equal to or larger than a corresponding value in the dithering table and the corresponding value is larger than the second threshold, the dithering unit sets a dot to be printed on a pixel of the gray-scale value.

5. The image processing apparatus according to claim 4, wherein
   the dithering unit retains the first threshold and the second threshold smaller than the first threshold,
   when the gray-scale value is equal to or smaller than the first threshold and the pass information indicates the first pass, and when the gray-scale value is smaller than a corresponding value in the dithering table, the dithering unit sets no dot to be printed on a pixel of the gray-scale value,
   when the gray-scale value is equal to or smaller than the second threshold and the pass information indicates the second pass, the dithering unit sets no dot to be printed on a pixel of the gray-scale value,
   when the gray-scale value is larger than the first threshold and the pass information indicates the first pass, and when the gray-scale value is smaller than a corresponding value in the dithering table or when the corresponding value is larger than the first threshold, the dithering unit sets no dot to be printed on a pixel of the gray-scale value, and when the gray-scale value is larger than the second threshold and the pass information indicates the second pass, and when the gray-scale value is smaller than a corresponding value in the dithering table or when the corresponding value is smaller than the second threshold, the dithering unit sets no dot to be printed on a pixel of the gray-scale value.

6. The image processing apparatus according to claim 1, wherein when a predetermined bit of the gray-scale value is 0 and the pass information indicates the first pass, and when the gray-scale value is equal to or larger than a corresponding value in the dithering table, the dithering unit sets a dot to be printed on a pixel of the gray-scale value, when the predetermined bit of the gray-scale value is 1 and the pass information indicates the first pass, and when the gray-scale value is equal to or larger than a corresponding value in the dithering table and the corresponding value is smaller than a minimum value of the gray-scale value in a case of the predetermined bit being 1, the dithering unit sets a dot to be printed on a pixel of the gray-scale value, and when the predetermined bit of the gray-scale value is 1 and the pass information indicates the second pass, and when the gray-scale value is equal to or larger than a corresponding value in the dithering table and the corresponding value is equal to or larger than the minimum value of the gray-scale value in a case of the predetermined bit being 1, the dithering unit sets a dot to be printed on a pixel of the gray-scale value.

7. The image processing apparatus according to claim 6, wherein when the predetermined bit of the gray-scale value is 0 and the pass information indicates the first pass, and when the gray-scale value is smaller than a corresponding value in the dithering table, the dithering unit sets no dot to be printed on a pixel of the gray-scale value, when the predetermined bit of the gray-scale value is 0 and the pass information indicates the second pass, the dithering unit sets no dot to be printed on a pixel of the gray-scale value, when the predetermined bit of the gray-scale value is 1 and the pass information indicates the first pass, and when the gray-scale value is smaller than a corresponding value in the dithering table or when the corresponding value is equal to or larger than the minimum value of the gray-scale value in a case of the predetermined bit being 1, the dithering unit sets no dot to be printed on a pixel of the gray-scale value, and when the predetermined bit of the gray-scale value is 1 and the pass information indicates the second pass, and when the gray-scale value is smaller than a corresponding value in the dithering table or when the corresponding value is smaller than the minimum value of the gray-scale value in a case of the predetermined bit being 1, the dithering unit sets no dot to be printed on a pixel of the gray-scale value.

8. The image processing apparatus according to claim 6, wherein the predetermined bit is the most significant bit of the gray-scale value.

9. The image processing apparatus according to claim 1, further comprising:
a display image creating unit that creates, when the pass information indicates the first pass, a display image representing a print result obtained in the first pass; and
a display unit that displays the display image.

10. The image processing apparatus according to claim 1, further comprising a selecting unit that allows a user to select a paper feed tray to be used in the second pass.

11. An image processing method comprising:
inputting a gray-scale value of each pixel constituting image data of a predetermined color;
inputting pass information indicating whether printing is a first pass to perform printing on a recording medium yet to be printed or a second pass to perform reprinting on the same surface of the recording medium already subjected to printing;
retaining a dithering table and a threshold, the dithering table providing a matrix of pixels, each of the pixels having a corresponding value; and
determining whether a dot is printed or not on each of the pixels in the matrix based on the pass information and by comparing magnitudes of the corresponding value, the threshold, and the gray-scale value with one another.

12. A computer program product comprising a non-transitory computer-readable medium containing a computer program that causes a computer to perform:
inputting a gray-scale value of each pixel constituting image data of a predetermined color;
inputting pass information indicating whether printing is a first pass to perform printing on a recording medium yet to be printed or a second pass to perform reprinting on the same surface of the recording medium already subjected to printing;
retaining a dithering table and a threshold, the dithering table providing a matrix of pixels, each of the pixels having a corresponding value; and
determining whether a dot is printed or not on each of the pixels in the matrix based on the pass information and by comparing magnitudes of the corresponding value, the threshold, and the gray-scale value with one another.

* * * * *